(12) United States Patent
Tian et al.

(10) Patent No.: US 10,871,785 B2
(45) Date of Patent: Dec. 22, 2020

(54) METHOD AND SYSTEM FOR CONTROLLING ATTITUDE OF ROTOR UNMANNED AERIAL VEHICLE

(71) Applicant: Haoxiang Electric Energy (Kunshan) Co., Ltd., Jiangsu (CN)

(72) Inventors: Yu Tian, Jiangsu (CN); Wenyan Jiang, Jiangsu (CN)

(73) Assignee: Haoxiang Electric Energy (Kunshan) Co., Ltd., Jiangsu (CN)

( * ) Notice: Subject to any disclaimer, the term of this patent is extended or adjusted under 35 U.S.C. 154(b) by 199 days.

(21) Appl. No.: 16/104,893

(22) Filed: Aug. 18, 2018

(65) Prior Publication Data
US 2019/0004541 A1    Jan. 3, 2019

(30) Foreign Application Priority Data

Aug. 18, 2017  (CN) .......................... 2017 1 0711307

(51) Int. Cl.
*G05D 1/08*   (2006.01)
*B64C 39/02*  (2006.01)
(Continued)

(52) U.S. Cl.
CPC ......... *G05D 1/0816* (2013.01); *B64C 39/024* (2013.01); *G05D 1/0669* (2013.01); *B64C 2201/146* (2013.01); *G08G 5/0069* (2013.01)

(58) Field of Classification Search
CPC .. G05D 1/0816; G05D 1/0669; B64C 39/024; B64C 2201/146; B64C 2201/141; G08G 5/0069
(Continued)

(56) References Cited

U.S. PATENT DOCUMENTS

2014/0138477 A1*  5/2014  Keennon ............... B64C 39/024
                                                    244/17.23
2016/0137293 A1*  5/2016  Santangelo ............ B64C 37/00
                                                    244/50
(Continued)

FOREIGN PATENT DOCUMENTS

WO    WO-2018010097 A1 *  1/2018  ............. B64C 27/08

OTHER PUBLICATIONS

Zhang et al., Flip Control for an Indoor Micro Aerial Vehicle, Aug. 2012, IEEE, 2012 International Conference on Computer Science and Service System (Year: 2012).*

(Continued)

*Primary Examiner* — Nadeem Odeh (57) ABSTRACT

A method for controlling an attitude of a rotor UAV (unmanned aerial vehicle) includes judging whether the rotor UAV is in a first attitude on a support base; and starting a first thrust generating device which is offset from a first side of a center of gravity of the rotor UAV, the first thrust generating device generating a thrust that faces away from the support base while working, the first side moving away from the support base, flipping the rotor UAV and switching the rotor UAV from the first attitude to a second attitude. Also, a system for controlling the attitude of the rotor UAV is provided. According to the method and the system, the rotor UAV can be switched between different attitudes without artificially assisting in adjusting a current attitude of the rotor UAV, so that the convenience in use and the satisfaction of experience are improved.

7 Claims, 3 Drawing Sheets

(51) Int. Cl.
*G05D 1/06* (2006.01)
*G08G 5/00* (2006.01)

(58) Field of Classification Search
USPC .............................................. 701/3
See application file for complete search history.

(56) References Cited

U.S. PATENT DOCUMENTS

| | | | |
|---|---|---|---|
| 2017/0043862 A1* | 2/2017 | Lippincott | B64C 39/024 |
| 2019/0144116 A1* | 5/2019 | Yuan | B64C 39/024 701/3 |
| 2020/0057454 A1* | 2/2020 | Ichihara | B64C 13/20 |

OTHER PUBLICATIONS

ArcBotics, Accelerometer, Jun. 23, 2016, ArcBotics Learning with Robots, ArcBotics Online Website <http://arcbotics.com/products/sparki/parts/accelerometer/> (Year: 2016).*

Wikipedia, Accelerometer, Jul. 18, 2016, Wikipedia the Free Encyclopedia, Wikipedia Online Encyclopedia <https://en.wikipedia.org/w/index.php?title=Accelerometer&oldid=730297420> (Year: 2016).*

* cited by examiner

METHOD AND SYSTEM FOR CONTROLLING ATTITUDE OF ROTOR UNMANNED AERIAL VEHICLE

CROSS REFERENCE OF RELATED APPLICATION

The present invention claims priority under 35 U.S.C. 119(a-d) to CN 201710711307.6, filed Aug. 18, 2017.

BACKGROUND OF THE PRESENT INVENTION

Field of Invention

The present invention relates to the field of UAVs (unmanned aerial vehicles), and more particularly to a method and a system for controlling an attitude of a rotor UAV.

Description of Related Arts

In recent years, with the continuous development of rotor UAVs, multi-rotor UAVs have emerged, such as quadrotor UAVs and six-rotor UAVs. During the flight, the rotor UAV sometimes encounters obstacles and falls to the ground, often causing the rotor UAV to roll over, so that the operator has to go to the position where the rotor UAV is dropped for picking up and re-righting the rotor UAV to operate the rotor UAV again. Therefore, the operation of the rotor UAV is troublesome and the experience is not good.

SUMMARY OF THE PRESENT INVENTION

An object of the present invention is to provide a method and a system for controlling an attitude of a rotor UAV (unmanned aerial vehicle). The method is able to control the rotor UAV to switch between different attitudes without artificially assisting in adjusting a current attitude of the rotor UAV, so that the convenience in use and the satisfaction of experience are improved.

To achieve the above object, the present invention provides a method for controlling an attitude of a rotor UAV (unmanned aerial vehicle), comprising step of:

judging whether the rotor UAV is in a first attitude on a support base; and starting a first thrust generating device which is offset from a first side of a center of gravity of the rotor UAV, the first thrust generating device generating a thrust that faces away from the support base while working, the first side moving away from the support base, flipping the rotor UAV and switching the rotor UAV from the first attitude to a second attitude.

Preferably, the method further comprises a step of obtaining an inclined direction and an inclined angle of the rotor UAV in the first attitude relatively to the support base.

Preferably, the method further comprises: obtaining a continuous first predetermined duration of the rotor UAV in the first attitude, judging and excluding instantaneous inclination of the rotor UAV, and determining that the rotor UAV is really in the first attitude.

Preferably, the method further comprises: before starting the first thrust generating device, starting a second thrust generating device which is offset from a second side of the center of gravity of the rotor UAV; or simultaneously starting both the first thrust generating device and the second thrust generating device, wherein: the first thrust generating device is opposite to the second thrust generating device; the second thrust generating device generates a thrust facing towards ground; a flip torque from the thrust generated by the second thrust generating device which applies to the rotor UAV is smaller than a flip torque from the thrust generated by the first thrust generating device which applies to the rotor UAV; the first side is opposite to the second side based on the center of gravity of the rotor UAV.

Preferably, in the method, when the rotor UAV switches to the second attitude, at least one of the first thrust generating device and the second thrust generating device is stopped.

Preferably, in the method, an X-axis and a Y-axis are provided and perpendicular to each other, the inclined direction comprises a first direction inclining around the X-axis, the inclined angle is an angle between the Y-axis and the support base; the inclined direction further comprises a second direction inclining around the Y-axis, the inclined angle is an angle between the X-axis and the support base.

Preferably, in the method, a Z-axis is provided and is perpendicular to both the X-axis and the Y-axis; the method further comprises collecting an accelerating speed in the Z-axis and determining a current state of the rotor UAV.

Preferably, in the method, when the accelerating speed is in a range of $-g$ m/s$^2$ to $0$ m/s$^2$, the rotor UAV is in an overturned attitude; when the accelerating speed is $g$ m/s$^2$, the rotor UAV is in a back attitude; the first attitude is the overturned attitude, and the second attitude is the back attitude.

Preferably, the method further comprises: after switching the rotor UAV from the first attitude to the second attitude, obtaining a continuous second predetermined duration of the rotor UAV in the second attitude, and determining the rotor UAV is in the second attitude.

Also, the present invention provides a system for controlling an attitude of a rotor UAV (unmanned aerial vehicle), comprising:

an attitude processor for judging whether the rotor UAV is in a first attitude on a support base; and a controller for starting a first thrust generating device which is offset from a first side of a center of gravity of the rotor UAV, wherein: the first thrust generating device generates a thrust that faces away from the support base while working, so as to move the first side away from the support base for flipping the rotor UAV to switch the rotor UAV from the first attitude to a second attitude.

Preferably, the system further comprises: a location processor for obtaining an inclined direction and an inclined angle of the rotor UAV in the first attitude relatively to the support base.

Preferably, the system further comprises: a timer for obtaining a predetermined duration of the rotor UAV in the first attitude, wherein: according to the predetermined duration of the rotor UAV in the first attitude, the attitude processor determines and excludes instantaneous inclination of the rotor UAV for accurately determining that the rotor UAV is really in the first attitude.

Preferably, in the system, the controller is also adapted for before starting the first thrust generating device, starting the second thrust generating device which is offset from a second side of the center of gravity of the rotor UAV; or simultaneously starting both the first thrust generating and the second thrust generating device;

the first thrust generating device is opposite to the second thrust generating device, the second thrust generating device generates a thrust facing towards ground, a flip torque from the thrust generated by the second thrust generating device which applies to the rotor UAV is smaller than a flip torque from the thrust generated by the first thrust generating device which applies to the rotor UAV, the first side is opposite to the second side based on the center of gravity of the rotor UAV.

Preferably, in the system, when the rotor UAV switches to the second attitude, the controller is also adapted for controlling at least one of the first thrust generating device and the second thrust generating device to stop working.

Preferably, in the system, an X-axis and a Y-axis are provided and perpendicular to each other, the inclined direction comprises a first direction inclining around the X-axis, the inclined angle is an angle between the Y-axis and the support base; the inclined direction further comprises a second direction inclining around the Y-axis, the inclined angle is an angle between the X-axis and the support base.

Preferably, the system further comprises: an acceleration processor, a Z-axis is provided and is perpendicular to both the X-axis and the Y-axis, the acceleration processor is adapted for collecting an accelerating speed in the Z-axis to judge a current state of the rotor UAV.

Preferably, in the system, when the accelerating speed is in a range of $-g$ m/s$^2$ to $0$ m/s$^2$, the rotor UAV is in an overturned attitude; when the accelerating speed is $g$ m/s$^2$, the rotor UAV is in a back attitude; the first attitude is the overturned attitude, and the second attitude is the back attitude.

Preferably, the system further comprises: a timer for obtaining a predetermined duration of the rotor UAV in the second attitude, wherein: according to the predetermined duration of the rotor UAV in the second attitude, the attitude processor determines that the rotor UAV is really in the second attitude.

BRIEF DESCRIPTION OF THE DRAWINGS

Features, advantages, and technical effects of exemplary embodiments of the present invention will be described with reference to drawings as follows.

In the drawings, the drawings are not drawn to an actual scale.

DETAILED DESCRIPTION OF THE PREFERRED EMBODIMENT

Various features and exemplary embodiments of the present invention are described in detail as below. In the following detailed description, many specific details are set forth to provide the comprehensive understanding of the present invention. It is apparent for those skilled in the art, however, that the present invention is able to be carried out without some of the specific details. The following description of the embodiments is merely to provide a better understanding of the present invention. The present invention is in no way limited to any specific configuration and algorithm set forth below, but overwrites any modifications, replacements, and improvements to elements, components, and algorithms without departing from the spirit and scope of the present invention. In the drawings and the following description, well-known structures and techniques are not shown so as to avoid unnecessary obscuring the present invention.

In the description of the present invention, it should be noted that, unless otherwise stated, the meaning of "multiple" is two or more; the terms "upper", "lower", "left", "right", "inside", "outside" and the like which indicate orientations or positional relationships are merely for easily describing the present invention and simplifying the description, but not intended to indicate or imply that the device or component has a particular orientation, is constructed and operated in a particular orientation, and therefore cannot be understood as limiting the present invention. Moreover, the terms "first", "second", and the like are used for descriptive purposes only and are not to be construed as indicating or implying the relative importance.

It should be noted that the embodiments in the present invention and the features in the embodiments may be combined with each other in case of no conflict. The present invention will be described in detail with reference to the accompanying drawings and the embodiments.

In order to better understand the present invention, a method for controlling an attitude of a rotor UAV (unmanned aerial vehicle) provided by the present invention is described in detail with reference to FIGS. 1 to 5.

The method for controlling the attitude of the rotor UAV provided by the present invention is able to control the rotor UAV to adjust a current attitude of the rotor UAV, so as to switch the rotor UAV between different attitudes for completing a corresponding action. For example, when the rotor UAV lands on the ground and in an overturn state, the rotor UAV is able to be controlled through the method provided by the present invention, so as to recover from the overturn state to a normally take-off state without artificially re-righting the rotor UAV. Therefore, the rotor UAV is easy to be operated, is improved in maneuverability, and has a better process experience.

Aiming at the deficiency that the attitude of the rotor UAV is unable to be adjusted when the rotor UAV lands on the support base in the prior art, the present invention provides a method and a system 200 for controlling the attitude of the rotor UAV.

Figure 1:
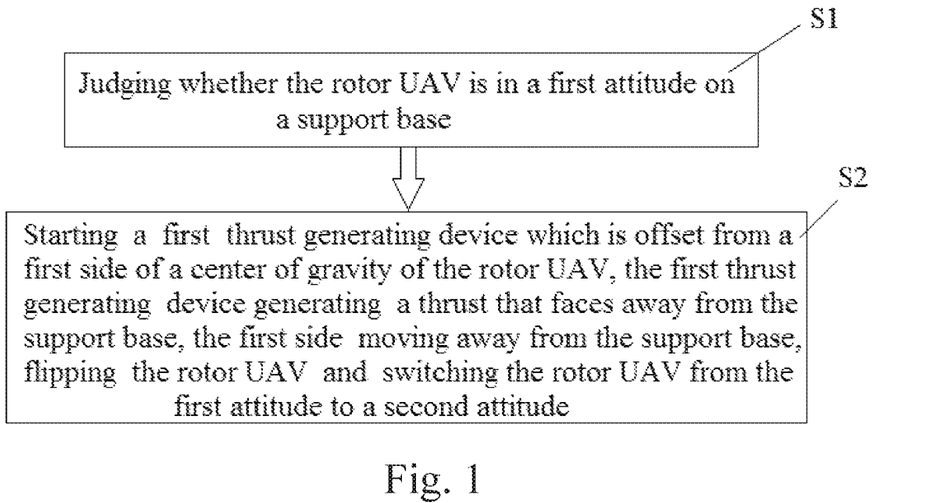
FIG. 1 is a schematic flow chart of a method for controlling an attitude of a UAV (unmanned aerial vehicle) according to a first preferred embodiment of the present invention.

As shown in FIG. 1, a method for controlling an attitude of a rotor UAV (unmanned aerial vehicle) according a first preferred embodiment of the present invention is illustrated, which comprises steps of:

(S1) judging whether the rotor UAV is in a first attitude on a support base; and (S2) starting a first thrust generating device which is offset from a first side of a center of gravity of the rotor UAV, the first thrust generating device generating a thrust that faces away from the support base, the first side moving away from the support base, flipping the rotor UAV and switching the rotor UAV from the first attitude to a second attitude.

In the first preferred embodiment of the present invention, the support base is ground or a surface of other supports. The first attitude is an attitude of the rotor UAV in a static state after landing on the support base. When the attitude of the rotor UAV in the static state matches the first attitude, the first thrust generating device of the rotor UAV is controlled to generate the thrust for attitude adjustment, so as to adjust the attitude of the rotor UAV from the first attitude to the second attitude which meets requirements.

The first thrust generating device according to the first preferred embodiment of the present invention is offset from the first side of the center of gravity of the rotor UAV, the thrust generated by the first thrust generating device faces away from the support base, so that the thrust is able to produce a flip torque relatively to the center of gravity, so as to raise a height of the first side of the rotor UAV for wholly flipping the rotor UAV to change the attitude thereof.

The method for controlling the attitude of the rotor UAV according to the first preferred embodiment of the present invention is able to be the method for automatically controlling or manually controlling the attitude of the rotor UAV. In the automatic control mode, the UAV rotor automatically judges whether a current attitude is in the first attitude, if it is judged that the current attitude is in the first attitude, the first thrust generating device is automatically started to adjust the attitude. In the manual control mode, when an operator observes that the attitude of the rotor UAV is in the first attitude, the first thrust generating device is remotely controlled through the manual operation to adjust the attitude.

The method for controlling the attitude of the rotor UAV according to the first preferred embodiment of the present invention is able to switch the rotor UAV between different attitudes without artificially assisting in adjusting the current attitude of the rotor UAV, thus improving the convenience and experience satisfaction during use.

Figure 2:
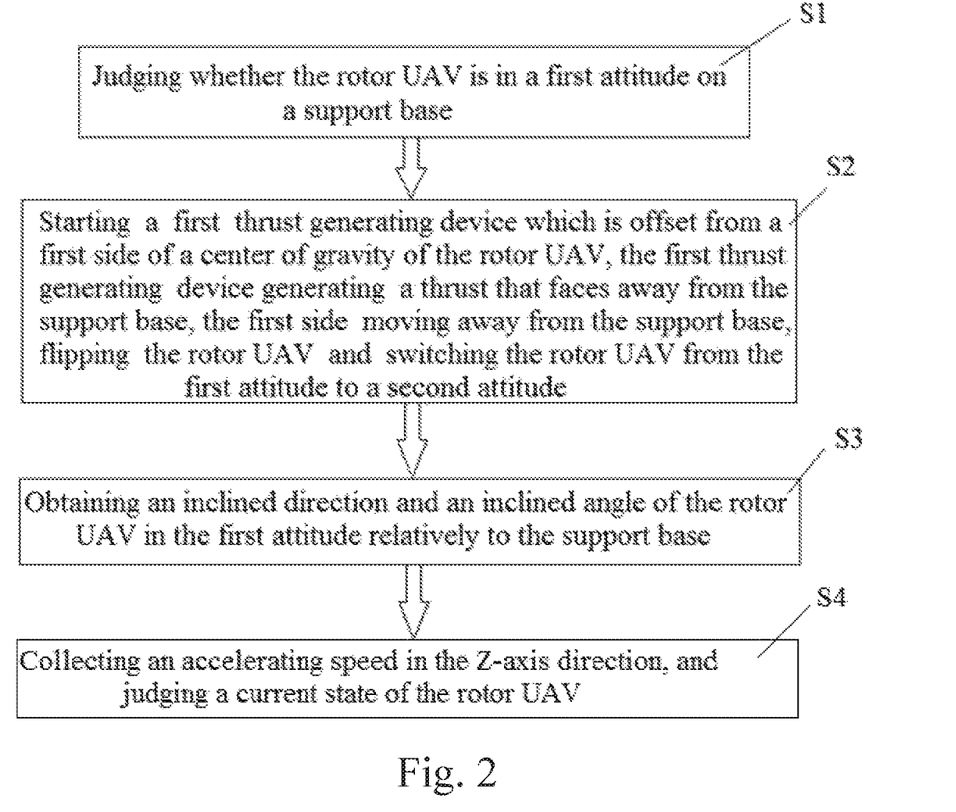
FIG. 2 is a schematic flow chart of a method for controlling an attitude of a UAV (unmanned aerial vehicle) according to a second preferred embodiment of the present invention.

As shown in FIG. 2, the method for controlling the attitude of the rotor UAV according to a second embodiment of the present invention is illustrated, which further comprises a step of:

(S3) obtaining an inclined direction and an inclined angle of the rotor UAV in the first attitude relatively to the support base.

Through obtaining the inclined direction and the inclined angle of the rotor UAV in the first attitude, a specific state of the first attitude is easily determined, so as to provide data references for a next attitude adjustment, thereby more accurately adjusting the attitude of the rotor UAV based on the inclined direction and the inclined angle. In the second preferred embodiment of the present invention, the inclined direction and the inclined angle of the rotor UAV relatively to the support base are able to be obtained through a gyroscope.

In the second preferred embodiment of the present invention, an X-axis, a Y-axis and a Z-axis are provided, all of the X-axis, the Y-axis and the Z-axis are virtual axes, and the X-axis, the Y-axis, and the Z-axis are perpendicular to each other. When the rotor UAV is in a normal takeoff state, the Z-axis is perpendicular to the support base, a positive direction of the Z-axis points away from the support base, and a negative direction of the Z-axis points to the support base. The inclined direction comprises a first direction inclining around the X-axis, and correspondingly, the inclined angle is an angle between the Y-axis and the support base. The inclined direction further comprises a second direction inclining around the Y-axis, and correspondingly, the inclined angle is an angle between the X-axis and the support base. The rotor UAV is able to rotate around the X-axis to pitch, to rotate around the Y-axis to roll, and to rotate around the Z-axis to yaw.

The method for controlling the attitude of the rotor UAV further comprises of:

(S4) collecting an accelerating speed in the Z-axis direction, and judging a current state of the rotor UAV.

It is accurate and reliable to judge the current state of the rotor UAV through the accelerating speed.

Preferably, the step of (S4) is able to be executed after the step of (S3).

Figure 3:
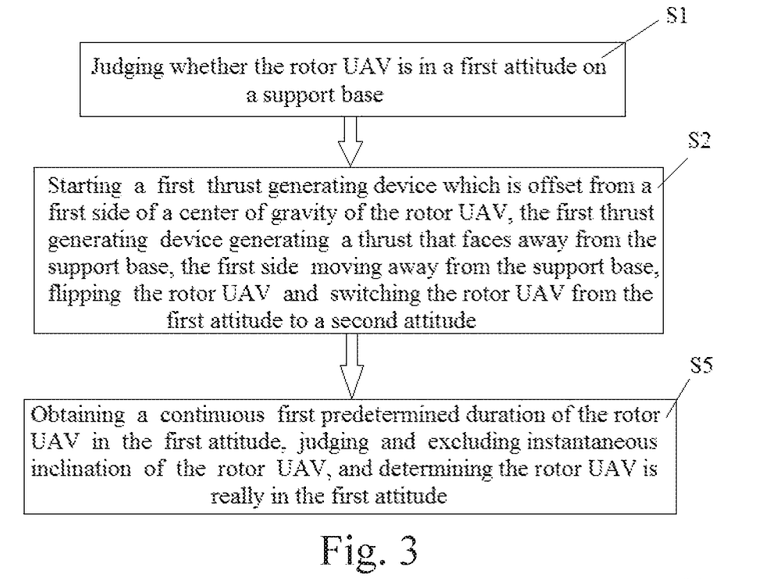
FIG. 3 is a schematic flow chart of a method for controlling an attitude of a UAV (unmanned aerial vehicle) according to a third preferred embodiment of the present invention.

As shown in FIG. 3, the method for controlling the attitude of the rotor UAV according to a third embodiment of the present invention is illustrated, which further comprises of:

(S5) obtaining a continuous first predetermined duration of the rotor UAV in the first attitude, judging and excluding instantaneous inclination of the rotor UAV, and determining the rotor UAV is really in the first attitude.

Preferably, the step of (S5) is able to be executed before the step of (S3), or after the step of (S3), or after the step of (S4). Through determining the rotor UAV is in the first attitude and the continuous first predetermined duration in the first attitude, it is ensured that the rotor UAV is really in the stable first attitude and the first attitude in an unstable state is excluded, which avoids mishandling the rotor UAV with the first attitude in the unstable state, so as to improve the control accuracy and process experience satisfaction. The first predetermined duration is in a range of 1 to 5 seconds.

Figure 4:
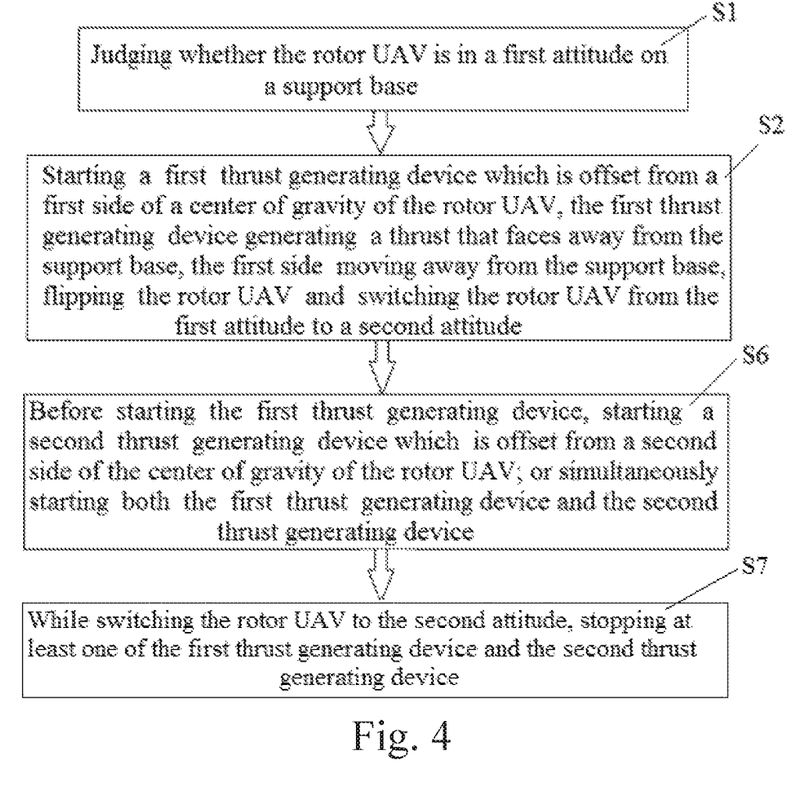
FIG. 4 is a schematic flow chart of a method for controlling an attitude of a UAV (unmanned aerial vehicle) according to a fourth preferred embodiment of the present invention.

As shown in FIG. 4, the method for controlling the attitude of the rotor UAV according to a fourth embodiment of the present invention is illustrated, which further comprises of:

(S6) before starting the first thrust generating device, starting a second thrust generating device which is offset from a second side of the center of gravity of the rotor UAV; or simultaneously starting both the first thrust generating device and the second thrust generating device.

The first thrust generating device is opposite to the second thrust generating device. The second thrust generating device generates a thrust facing towards the ground. A flip torque from the thrust generated by the second thrust generating device which applies to the rotor UAV is smaller than a flip torque from the thrust generated by the first thrust generating device which applies to the rotor UAV, wherein the first side is opposite to the second side based on the center of gravity of the rotor UAV.

The flip torque produced by the first thrust generating device is opposite to the flip torque produced by the second thrust generating device relatively to the center of gravity of the UAV, so as to speed up the flipping speed of the rotor UAV, for more quickly switching the rotor UAV from the first attitude to the second attitude. Moreover, the flip torque produced by the second thrust generating device is able to ensure that the second side of the rotor UAV is pressed against the support base, so as to avoid detaching the second side of the rotor UAV from the support base to affect the flipping effect or cause the flip to fail.

Preferably, the step of (S6) is able to be executed before the step of (S3), after the step of (S3), after the step of (S4), or after the step of (S5).

In the fourth preferred embodiment of the present invention, both the first thrust generating device and the second thrust generating device are able to be propeller assemblies of the rotor UAV, and also able to be power equipment independently fixed to a fuselage of the rotor UAV.

The method for controlling the attitude of the rotor UAV further comprises:

(S7) while switching the rotor UAV to the second attitude, stopping at least one of the first thrust generating device and the second thrust generating device.

When the step of (S7) is executed after the step of (S2), the rotor UAV switches to the second attitude, the first thrust generating device is stopped, so as to maintain the rotor UAV in the second attitude, to avoid detaching the rotor UAV from the second attitude after switching the rotor UAV to the second attitude.

When the step of (S7) is executed after the step of (S6), the rotor UAV switches to the second attitude, at least one of the first thrust generating device and the second thrust generating device is stopped, so as to maintain the rotor UAV in the second attitude, to avoid detaching the rotor UAV from the second attitude after switching the rotor UAV to the second attitude.

Preferably, the step of (S7) is able to be executed after the step of (S6).

Figure 5:
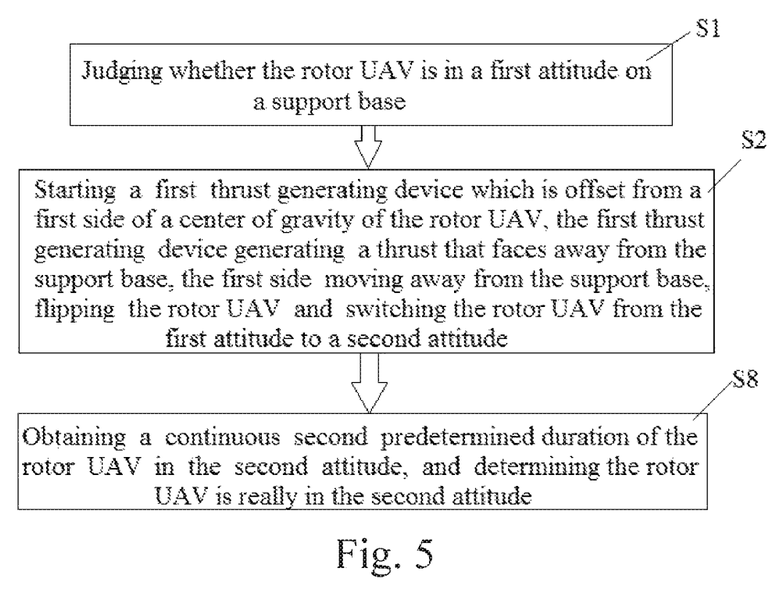
FIG. 5 is a schematic flow chart of a method for controlling an attitude of a UAV (unmanned aerial vehicle) according to a fifth preferred embodiment of the present invention.

As shown in FIG. 5, the method for controlling the attitude of the rotor UAV according to a fifth preferred embodiment of the present invention is illustrated, which further comprises:

(S8) obtaining a continuous second predetermined duration of the rotor UAV in the second attitude, and determining the rotor UAV is really in the second attitude.

Through determining the rotor UAV is in the second attitude and the continuous second predetermined duration in the second attitude it is ensured that the rotor UAV is really in the stable second attitude and the second attitude in the unstable state is excluded, which avoids mishandling the rotor UAV with the second attitude in the unstable state, so as to improve the control accuracy and process experience satisfaction. The second predetermined duration is in a range of 1 to 5 seconds.

Preferably, the step of (S8) is able to be executed before the step of (S3), after the step of (S3), after the step of (S4), after the step of (S5), after the step of (S6), or after the step of (S7).

In one embodiment, the first attitude is an overturning attitude of the rotor UAV on the support base. The second attitude is a back attitude of the rotor UAV on the support base, that is, a pending takeoff state. When the rotor UAV lands on the supporting base and encounters the overturning condition, the attitude of the rotor UAV is able to be adjusted by the method provided by the present invention, and is able to be switched from the overturning attitude to the back attitude, thus taking off the rotor UAV. Therefore, it is not necessary to artificially assist in switch the rotor UAV from the overturning attitude to the back attitude, and then the rotor UAV takes off, so that the operation process of the rotor UAV is more convenient and the experience is better.

In one embodiment, the gyroscope can be used to determine that the rotor UAV is in the overturning attitude or the back attitude, or the accelerating speed in the Z-axis is collected to determine that the rotor UAV is in the overturning attitude or the back attitude.

Preferably, the accelerating speed in the Z-axis is collected to determine that the rotor UAV is in the overturning attitude or the back attitude. In one example, when the accelerating speed in the Z-axis is in a range of $-g$ m/s$^2$ to 0 m/s$^2$, the rotor UAV is in the overturning attitude, and at this time, the positive direction of the Z-axis points towards the support base. When the accelerating speed in the Z-axis is $-g$ m/s, it is judged that the rotor UAV is entirely turned over, and at this time, the Z-axis is perpendicular to the support base, both the X-axis and the Y-axis are parallel to the support base.

When the accelerating speed in the Z-axis is g m/s$^2$, the rotor UAV is entirely in the back attitude, and at this time, the positive direction of the Z-axis points away from the support base, both the X-axis and the Y-axis are parallel to the support base, and the rotor UAV is able to normally take-off.

Figure 6:
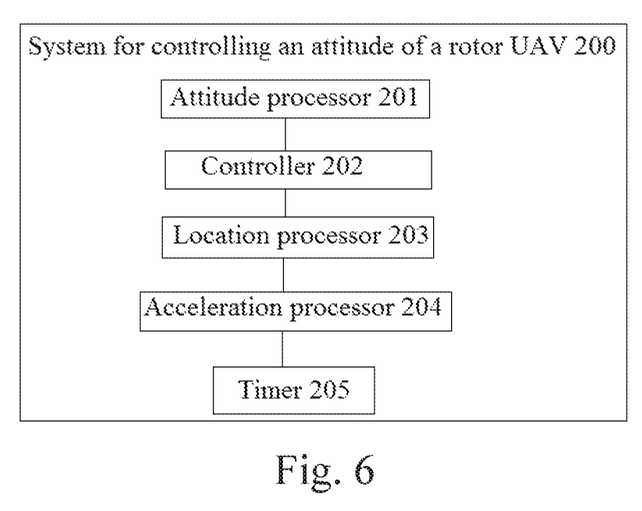
FIG. 6 is a schematic block diagram of a system for controlling an attitude of a UAV (unmanned aerial vehicle) according to a sixth preferred embodiment of the present invention.

As shown in FIG. 6, a system 200 for controlling an attitude of a rotor UAV according to a sixth preferred embodiment of the present invention is illustrated, which comprises:

an attitude processor 201 for judging whether the rotor UAV is in a first attitude on a support base; and a controller 202 for starting a first thrust generating device which is offset from a first side of a center of gravity of the rotor UAV, wherein the first thrust generating device generates a thrust that faces away from the support base, so as to move the first side away from the support base for flipping the rotor UAV to switch the rotor UAV from the first attitude to a second attitude.

The system for controlling the attitude of the rotor UAV according to the sixth preferred embodiment of the present invention is able to control the rotor UAV to switch between different attitudes without artificially assisting in adjusting a current attitude of the rotor UAV. Therefore, the convenience in use and the satisfaction of experience are improved.

The system 200 for controlling the attitude of the rotor UAV further comprises:

a location processor 203 for obtaining an inclined direction and an inclined angle of the rotor UAV in the first attitude relatively to the support base. Through the inclined direction and the inclined angle of the rotor UAV in the first attitude relatively to the support base, it is easy for the location processor 203 to accurately determine a specific state of the first attitude, so as to provide data references for a next attitude adjustment, to more accurately adjust the attitude of the rotor UAV.

In the sixth preferred embodiment of the present invention, an X-axis, a Y-axis and a Z-axis are provided, all of the X-axis, the Y-axis and the Z-axis are virtual axes, and the X-axis, the Y-axis, and the Z-axis are perpendicular to each other. When the rotor UAV is in a normal takeoff state, the Z-axis is perpendicular to the support base. The inclined direction comprises a first direction inclining around the X-axis, and correspondingly, the inclined angle is an angle between the Y-axis and the support base. The inclined direction further comprises a second direction inclining around the Y-axis, and correspondingly, the inclined angle is an angle between the X-axis and the support base.

The system 200 for controlling the attitude of the rotor UAV further comprises:

an acceleration processor 204 for collecting an accelerating speed in the Z-axis to determine the current state of the rotor UAV.

It is accurate and reliable to determine the current state of the rotor UAV through the accelerating speed.

The system 200 for controlling the attitude of the rotor UAV further comprises: a timer 205 for obtaining a predetermined duration of the rotor UAV in the first attitude. According to the predetermined duration of the rotor UAV in the first attitude, the attitude processor 201 determines and excludes instantaneous inclination of the rotor UAV for accurately determining the rotor UAV in the first attitude.

Through determining the rotor UAV is in the first attitude and the continuous first predetermined duration in the first attitude, it is ensured that the rotor UAV is really in the stable first attitude and the first attitude in an unstable state is excluded, which avoids mishandling the rotor UAV with the first attitude in the unstable state, so as to improve the control accuracy and process experience satisfaction. The first predetermined duration is in a range of 1 to 5 seconds.

The controller 202 is also adapted for controlling the second thrust generating device. Before starting the first thrust generating device, start the second thrust generating device which is offset from a second side of the center of gravity of the rotor UAV; or simultaneously start both the first thrust generating device and the second thrust generating device.

The first thrust generating device is opposite to the second thrust generating device. The second thrust generating device generates a thrust facing towards the ground. A flip torque from the thrust generated by the second thrust generating device which applies to the rotor UAV is smaller than a flip torque from the thrust generated by the first thrust generating device which applies to the rotor UAV, wherein the first side is opposite to the second side based on the center of gravity of the rotor UAV.

The flip torque produced by the first thrust generating device is opposite to the flip torque produced by the second thrust generating device relatively to the center of gravity of the rotor UAV, so as to speed up the flipping speed of the rotor UAV, for more quickly switching the rotor UAV from the first attitude to the second attitude. Moreover, the flip torque produced by the second thrust generating device is able to ensure that the second side of the rotor UAV is pressed against the support base, so as to avoid detaching the second side of the rotor UAV from the support base to affect the flipping effect or cause the flip to fail.

In the sixth preferred embodiment of the present invention, both the first thrust generating device and the second thrust generating device are able to be propellers of the rotor UAV, and also able to be power equipment independently fixed to a fuselage of the rotor UAV.

The controller 202 is also adapted for sending a stop command to the first thrust generating device and the second thrust generating device. When the rotor UAV switches to the second attitude, at least one of the first thrust generating device and the second thrust generating device is stopped.

At least one of the first thrust generating device and the second thrust generating device is stopped for maintaining the rotor UAV in the second attitude, so as to avoid detaching the rotor UAV from the second attitude after switching the rotor UAV to the second attitude.

The timer 205 is further adapted for obtaining a predetermined duration of the rotor UAV in the second attitude. According to the predetermined duration of the rotor UAV in the second attitude, the attitude processor 201 determines the rotor UAV is really in the second attitude.

After the rotor UAV switches from the first attitude to the second attitude, the predetermined duration of the rotor UAV in the second attitude is obtained, so as to ensure that the rotor UAV is really in the stable second attitude and the second attitude in the unstable state is excluded, which avoids mishandling the rotor UAV with the second attitude in the unstable state, to improve the control accuracy and process experience satisfaction. The second predetermined duration is in a range of 1 to 5 seconds.

In one embodiment, the first attitude is an overturning attitude of the rotor UAV on the support base. The second attitude is a back attitude of the rotor UAV on the support base, that is, a pending takeoff state. When the rotor UAV lands on the supporting base and encounters the overturning condition, the attitude of the rotor UAV is able to be adjusted by the system provided by the present invention, and is able to be switched from the overturning attitude to the back attitude, thus taking off the rotor UAV. Therefore, it is not necessary to artificially assist in switch the rotor UAV from the overturning attitude to the back attitude, and then the rotor UAV takes off, so that the operation process of the rotor UAV is more convenient and the experience is better.

When the accelerating speed in the Z-axis collected by the acceleration processor 204 is in a range of $-g$ m/s$^2$ to 0 m/s$^2$, the rotor UAV is in the overturning attitude, and at this time, the positive direction of the Z-axis points towards the support base. When the accelerating speed in the Z-axis is $-g$ m/s$^2$, it is judged that the rotor UAV is entirely turned over, and at this time, the Z-axis is perpendicular to the support base, both the X-axis and the Y-axis are parallel to the support base.

When the accelerating speed in the Z-axis collected by the acceleration processor 204 is g m/s$^2$, the rotor UAV is entirely in the back attitude, and at this time, the positive direction of the Z-axis points away from the support base, both the X-axis and the Y-axis are parallel to the support base, and the rotor UAV is able to normally take-off.

In the flight, when the rotor UAV hits the obstacle and falls to the support base, propellers of the rotor UAV continuously rotating, and the rotor UAV is judged whether is in the overturning state through the gyroscope or the acceleration processor. When the timer detects that a time of the rotor UAV is in the overturning attitude exceeds 2 s, the controller controls all the propellers to stop rotating. Then, the controller controls all the propellers of the rotor UAV to reversely rotate and in an idle state. The thrust produced by propellers located at one side of the rotor UAV which is far away from the support base is larger than the thrust produced by propellers located at another side of the rotor UAV which is close to the support base, so as to adjust the rotor UAV from the overturning attitude to the back attitude. After determining the rotor UAV is in the back attitude through the gyroscope or the acceleration processor, and determining the rotor UAV in the overturning attitude exceeds is through the timer, the controller controls all the propellers to return to the normal rotation and enter the idle speed for normally taking-off. In the sixth preferred embodiment of the present invention, the first thrust generating device is propellers located at one side of the rotor UAV which is far away from the support base, the second thrust generating device is propellers located at another side of the rotor UAV which is close the support base, the first thrust generating device is opposite to the second thrust generating device.

The rotor UAV in above preferred embodiments is able to be quadrotor, six-rotor or eight-rotor UAV.

It should be understood that the present invention has been described with reference to the preferred embodiments thereof, and the same or similar parts of the various embodiments may be referred to each other without departing from the protective scope of the present invention. Each embodiment focuses on differences from other embodiments. For the embodiments about the device, the related contents can refer to the description of the embodiments about the method. The present invention is not limited to the specific steps and structures described above and illustrated in the drawings. A person skilled in the art can make various changes, modifications and additions, or change the order between the steps after understanding the spirit of the present invention. Also, a detailed description of known method techniques is omitted herein for brevity. The present invention is not limited to the specific embodiments disclosed herein, but includes all technical solutions falling within the scope of the claims.

What is claimed is:

1. A method for controlling an attitude of a rotor unmanned aerial vehicle (UAV), the method comprising steps of:
   judging whether the rotor UAV is in a first attitude on a support base;
   starting a first thrust generating device which is offset from a first side of a center of gravity of the rotor UAV, and the first thrust generating device generating a thrust that faces away from the support base while working for moving the first side away from the support base to flip the rotor UAV, so that the rotor UAV is switched from the first attitude to a second attitude;
   obtaining an inclined direction and an inclined angle of the rotor UAV relatively to the support base when the rotor UAV is in the first attitude;
   obtaining a continuous first predetermined duration of the rotor UAV in the first attitude, judging and excluding instantaneous inclination of the rotor UAV, and determining that the rotor UAV is in the first attitude; and
   before starting the first thrust generating device, starting a second thrust generating device which is offset from a second side of the center of gravity of the rotor UAV; or simultaneously starting both the first thrust generating device and the second thrust generating device, wherein:
   the first thrust generating device is opposite to the second thrust generating device; the second thrust generating device generates a thrust facing towards ground; a flip torque from the thrust generated by the second thrust generating device which applies to the rotor UAV is smaller than a flip torque from the thrust generated by the first thrust generating device which applies to the rotor UAV the first side is opposite to the second side based on the center of gravity of the rotor UAV;
   when the rotor UAV switches to the second attitude, at least one of the first thrust generating device and the second thrust generating device is stopped;
   an X-axis and a Y-axis, acting as virtual reference axes, are provided and perpendicular to each other, the inclined direction comprises a first direction inclining relatively to the X-axis and a second direction inclining relatively to the Y-axis, the inclined angle comprises an angle between the Y-axis and the support base and an angle between the X-axis and the support base.

2. The method, as recited in claim 1, wherein: a Z-axis is provided and is perpendicular to both the X-axis and the Y-axis; the method further comprises collecting an accelerating speed in the Z-axis and determining a current state of the rotor UAV.

3. The method, as recited in claim 2, wherein: when the accelerating speed is in a range of $-g$ m/s$^2$ to 0 m/s$^2$, the rotor UAV is in an overturned attitude; when the accelerating speed is g m/s$^2$, the rotor UAV is in a right-side up attitude; the first attitude is the overturned attitude, and the second attitude is the right-side up attitude, here, g is acceleration of gravity.

4. A system for controlling an attitude of a rotor unmanned aerial vehicle (UAV), the system comprising:
   an attitude processor for judging whether the rotor UAV is in a first attitude on a support base;
   a controller for starting a first thrust generating device which is offset from a first side of a center of gravity of the rotor UAV, wherein: the first thrust generating device generates a thrust that faces away from the support base while working, so as to move the first side away from the support base for flipping the rotor UAV to switch the rotor UAV from the first attitude to a second attitude;
   a location processor for obtaining an inclined direction and an inclined angle of the rotor UAV relatively to the support base when the rotor UAV is in the first attitude; and
   a timer for obtaining a predetermined duration of the rotor UAV in the first attitude, wherein:
   according to the predetermined duration of the rotor UAV in the first attitude, the attitude processor determines and excludes instantaneous inclination of the rotor UAV for determining that the rotor UAV is in the first attitude;
   the controller is also adapted for before starting the first thrust generating device, starting the second thrust generating device which is offset from a second side of the center of gravity of the rotor UAV or simultaneously starting both the first thrust generating and the second thrust generating device;
   the first thrust generating device is opposite to the second thrust generating device, the second thrust generating device generates a thrust facing towards ground, a flip torque from the thrust generated by the second thrust generating device which applies to the rotor UAV is smaller than a flip torque from the thrust generated by the first thrust generating device which applies to the rotor UAV, the first side is opposite to the second side based on the center of gravity of the rotor UAV;
   when the rotor UAV switches to the second attitude, the controller is also adapted for controlling at least one of the first thrust generating device and the second thrust generating device to stop working;
   an X-axis and a Y-axis, acting as virtual reference axes, are provided and perpendicular to each other, the inclined direction comprises a first direction inclining relatively to the X-axis and a second direction inclining relatively to the Y-axis, the inclined angle comprises an angle between the Y-axis and the support base and an angle between the X-axis and the support base.

5. The system, as recited in claim 4, further comprising: an acceleration processor, a Z-axis is provided and is perpendicular to both the X-axis and the Y-axis, the acceleration processor is adapted for collecting an accelerating speed in the Z-axis to judge a current state of the rotor UAV.

6. The system, as recited in claim 5, wherein: when the accelerating speed is in a range of $-g$ m/s$^2$ to 0 m/s$^2$, the rotor UAV is in an overturned attitude; when the accelerating speed is g m/s$^2$, the rotor UAV is in a right-side up attitude; the first attitude is the overturned attitude, and the second attitude is the right side up attitude, here, g is acceleration of gravity.

7. The system, as recited in claim 6, further comprising: a timer for obtaining a predetermined duration of the rotor UAV in the second attitude, wherein: according to the predetermined duration of the rotor UAV in the second attitude, the attitude processor determines that the rotor UAV is in the second attitude.

* * * * *